United States Patent [19]

Williams

[11] E Re. 29,753

[45] Reissued Sep. 5, 1978

[54] ASBESTOS-FREE JOINT COMPOUNDS

[75] Inventor: Terrance L. Williams, Crystal Lake, Ill.

[73] Assignee: United States Gypsum Company, Chicago, Ill.

[21] Appl. No.: 754,309

[22] Filed: Dec. 27, 1976

Related U.S. Patent Documents

Reissue of:

[64] Patent No.: 3,891,453
Issued: Jun. 24, 1975
Appl. No.: 382,973
Filed: Jul. 26, 1973

[51] Int. Cl.[2] ..... C04B 11/16

[52] U.S. Cl. ..... 106/85; 106/109; 106/111; 106/115

[58] Field of Search ..... 106/85, 109, 110, 111, 106/114, 115; 260/29.6 PS, 29.6 S, 29.6 RW

[56] References Cited

U.S. PATENT DOCUMENTS

| | | | |
|---|---|---|---|
| 1,587,973 | 6/1926 | Makowski | 106/115 |
| 1,785,053 | 12/1930 | Stodder | 106/114 |
| 2,662,024 | 12/1953 | Riddell et al. | 106/109 |
| 3,279,934 | 10/1966 | Schuppner | 106/85 |
| 3,297,601 | 1/1967 | Maynard et al. | 106/85 |
| 3,483,156 | 12/1969 | Mills et al. | 260/29.6 S |
| 3,867,335 | 2/1975 | Reed et al. | 260/29.6 RW |
| 3,907,725 | 9/1975 | Forte et al. | 260/29.6 S |

*Primary Examiner*—J. Poer
*Attorney, Agent, or Firm*—Samuel Kurlandsky; Robert H. Robinson; Kenneth R. Roberts

[57] ABSTRACT

A joint compound which is preferably asbestos-free, for use in finishing joints between wallboards, comprising a filler, a binder, and any two or all three of a water-holding agent; a slip-inducing colloid; and a non-swelling clay having sufficient pseudoplasticity to render the composition non-leveling.

12 Claims, 3 Drawing Figures

ASBESTOS-FREE JOINT COMPOUNDS

Matter enclosed in heavy brackets [ ] appears in the original patent but forms no part of this reissue specification; matter printed in italics indicates the additions made by reissue.

BACKGROUND OF THE INVENTION

In the construction of buildings, one of the most common elements is gypsum wallboard, often known as "drywall", used to construct the walls and/or ceilings. Walls made from gypsum wallboard are conventionally constructed by fixing the panels to studs, and filling and coating the joints with a specially prepared adhesive called a joint compound. This process generally proceeds in the following fashion: a taping grade joint compound is placed within the joint formed by the abutted edges of the wallboards, and a perforated tape is embedded within the taping compound. When dry (or set), a second, topping grade joint compound is coated over the joint. This may be sanded lightly, and third coat is applied and conventionally finished. Another grade of joint compound is an all-purpose grade which may be used, as the name suggests, for embedding the tape and for the finishing coats. In some instances, a patterned effect is given to the all-purpose joint compound to leave a textured finish.

The primary difference in the past between the various grades of joint compound has been in the differences in the amounts of each ingredient. Thus, no matter what the grade, joint compounds invariably include a filler and a binder. More binder is used for the taping grade than for the topping grade. Typical fillers may be calcium carbonate, calcium sulfate hemihydrate, or calcium sulfate dihydrate. As is obvious, the choice determines whether the joint compound hardens by drying or by setting. An example of a setting type joint compound is taught in U.S. Pat. No. 3,297,601.

In addition, conventionally it has been necessary to include asbestos as a key ingredient. However, asbestos is becoming more and more an unacceptable health hazard, particularly where airborne. Health experts have indicated that not only does it cause mesothelioma, it may cause other forms of lung cancer as well, and may be a greater source for the latter than automobile fumes. Because of such effects, the Occupational Safety and Health Administration has established a U.S. Asbestos Standard, published in vol. 37, pp. 11320–11322 of the Federal Register, which provides that, at no time may the concentration of the asbestos fibers longer than 5 micrometers exceed 10 in number per cc. of air. In addition, effective July 1, 1976, the airborne concentration of asbestos longer than five micrometers in any working area, on the average, may not exceed two fibers per cc. of air. The asbestos in joint compounds becomes airborne in two ways: when the compound is dumped into water, and when the dried or set coat is sanded prior to the application of another coat or some other finish. Hand mixing the dry mix of ingredients into water is a primary first step, as many joint compounds are packaged dry and wetted by the applicator on site. The microscopic fineness of the asbestos causes it to literally puff into the air into an invisible cloud. Actual measurements have indicated that such mixing may cause a concentration of asbestos fibers longer than five micrometers of up to 55 fibers per cubic centimeter of air in the breathing area in the vicinity of the mixing period. Sanding may cause a fiber concentration of slightly over 3 fibers per cc. of air over an extended period of time. Clearly, by 1976, the conventional formula and the use of asbestos therein will hardly meet the above Asbestos Standard.

Thus, an asbestos-free joint compound is needed. Heretofore, such has not been readily obtainable, due to the unique combination of features provided by asbestos, especially concerning the workability of the joint compound.

SUMMARY OF THE INVENTION

The invention concerns the discovery that asbestos has provided certain functions in joint compounds which can be obtained from certain asbestos substitutes. More specifically, it has been found that an acceptable joint compound can be obtained, for use in finishing joints when mixed with water, from a mixture comprising a filler selected from the group consisting of calcium carbonate and calcium sulfate; a binder; and two of the following three ingredients: a water-holding agent, a slip-inducing colloid, and a non-swelling clay having sufficient pseudoplasticity to render the composition non-leveling. In most instances, all three of the above are used for the best results.

Accordingly, it is an object of the invention to provide a joint compound having working properties heretofore achieved only through the use of asbestos, without the necessity of including asbestos in the formulation.

It is a related object of the invention to provide such a joint compound either in dry powder form or ready-mixed form, and either as a setting type or a drying type.

Other objects and advantages will become apparent upon reference to the following brief description of the drawings and the description of the preferred embodiments.

DESCRIPTION OF THE PREFERRED EMBODIMENTS

Figure 1:
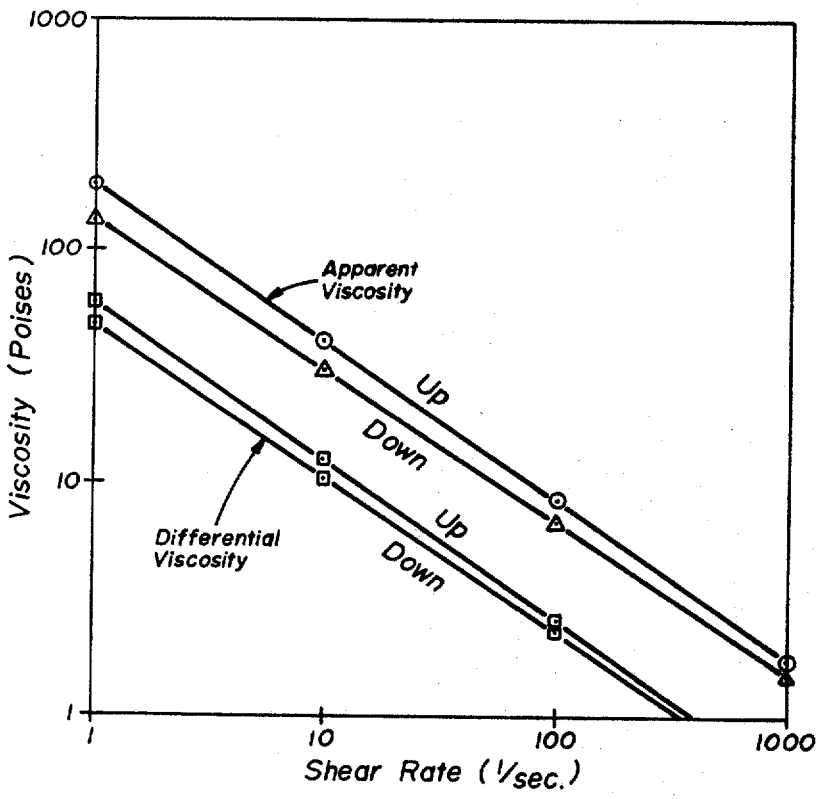
FIG. 1 is a log-log graph of shear rate versus both apparent and differential viscosity, measured for one of the ingredients utilized by the invention.

It has been found that asbestos in joint compound provides three functions: non-leveling, slip, and water retention. The first two of these control the workability of the joint compound. By "non-leveling", it is meant the ability of the joint compound to retain at least temporarily a given shape against the influence of gravity. Other examples of this property include soft butter or a cake frosting. By "slip", it is meant the ability to spread smoothly in a frictionless manner, without drag.

It further has been found that two or all of three ingredients will provide the foregoing three functions, depending on the grade and type of joint compound desired. The best results are obtained when the ingredients are selected from 1) sodium carboxymethycellulose, hereinafter SCMC, 2) attapulgus clay, and 3) a slip-inducing colloid such as amine-modified montmorillonite clay gel or xanthan gum. All three of these act as water-retention aids or water-holding agents, the SCMC having this as its primary function. The non-leveling function is provided primarily by the attapulgus clay. The slip is provided by both the attapulgus clay and the colloid. The relative amounts depend upon the grade of compound desired, but in general the SCMC may be between about 0.1 and about 1%, the attapulgus clay between about 0.5 and about 6%, and the colloid between about 0.1% and about 2%, all measured as a percent of the total dry weight.

Other water-retention aids, particularly those containing cellulose, can be used in addition or in place of SCMC. SCMC is preferred only because it enhances the binder and does not detract from the non-leveling properties of the attapulgus clay. Similarly, other non-leveling agents may be used, as long as they are non-swelling and generally have the viscosity characteristics of the attapulgus clay. Also colloids other than the modified montmorillonite gel or xanthan gum are acceptable if their viscosity behavior is similar to that of the clay gel or the xanthan gum.

Thus, to make a dry stored topping grade joint compound, a mixture of the above-identified ingredients is prepared as explained below. This can be made either with calcium carbonate or calcium sulfate dihydrate as a filler, so as to harden by drying, or with a calcium sulfate hemihydrate filler, so as to harden by setting. The taping guide can be made from an identical formula, except for the amounts of the conventional binder and thickner. For the all-purpose grade, the clay or the colloid can be omitted. Any one of the SCMC, the clay, or the colloid can be omitted in making ready-mixed joint compound which is stored wet.

The remaining components of the joint compound are conventional, non-critical, and are readily apparent from the literature, which also teaches the amounts to be used. Various fillers have already been discussed, including calcium carbonate, calcium sulfate dihydrate, otherwise known as landplaster or terra alba, and calcium sulfate hemihydrate. The filler may constitute between about 37 to about 92 percent of the total non-valatile solids weight. Still other conventional ingredients, disclosed in said U.S. Pat. No. 3,297,601, include the binder, a thickener, mica, and various preservatives. The binder thus may be polyvinyl alcohol, various starches, polyvinyl acetate, casein, soy protein, or mixtures of these. Preferably the binder comprises from about 1 to about 7% of the total dry weight. Common thickeners are hydroxypropyl methylcellulose, hydroxyethylcellulose, hydroxyethyl methylcellulose, alginates, and sodium carboxymethylcellulose. Preferably the thickener is present in an amount between about 0.2 and 1%. The mica may be between about 5 and about 42% of the total dry solids weight. The preservatives constitute a very minor portion of the weight, as is well known.

To further illustrate the invention, various examples are set forth as preferred embodiments. These examples are not intended to be limiting, but can be expanded as noted above.

EXAMPLE NO. 1

A topping grade joint compound was prepared in powder form according to the following formula:

| Ingredient | Weight Percent of Total Dry Solids |
|---|---|
| Calcium carbonate filler | 79.9 |
| Polyvinyl alcohol binder | 1.5 |
| Hydroxyethyl cellulose thickener | 0.8 |
| Preservatives | 0.6 |
| Mica | 15.0 |
| Sodium carboxymethyl cellulose | 0.5 |
| Attapulgus clay | 1.5 |
| Amine-modified montmorillonite clay gel | 0.2 |

Except where noted, the source of the SCMC for the Examples tested was Hercules Incorporated, the particular brand name being "CMC 4H1" having, in a 1% solution, a viscosity range at 25° C of between about 400 and 1000 cps. The degree of substitution range was between 0.38 and 0.48.

The modified montmorillonite clay gel used in Example No. 1 and all the following Examples was "Bentone LT" obtained from NL Industries Incorporated, having a specific gravity of 1.8, a weight per gal. of 15 lbs., and viscosity characteristics illustrated in FIG. 1 for a 2% solution of the gel. The data identified on the curve has been arbitrarily assigned for a yield value equal to zero, but in actuality it has been found that the static yield value of the gel equals about 35 dynes per square centimeter. Both the differential and apparent viscosity indicate a pseudoplastic nature.

Figure 2:
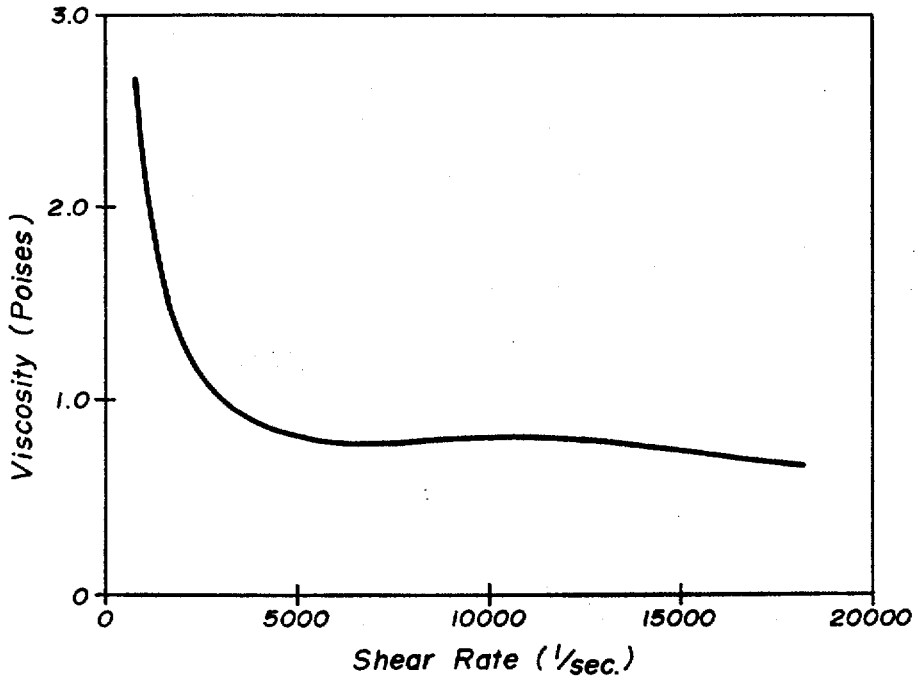
FIG. 2 is a graph illustrating shear rate versue apparent viscosity for another ingredient and, FIG. 3 is a semi-log graph of viscosity versus RPM for yet another ingredient used in the invention.

The attapulgus clay for all Examples was "Attagel 40" obtained from Engelhard Products, having an average particle size of about 0.14 microns, a bulking value of 19.7 lbs. per gal., a pH of between about 7.5 and 9.5, a bulk density of between about 19 to about 22 lb. per cu. ft., and a B.E.T. surface area of about 210 $m.^2/gm.$ "Attagel 50" supplied by the same source is also acceptable, as it has similar properties. The viscosity behavior of a 20% solution of the attapulgus clay is shown in FIG. 2. The clay is rheopectic in nature, as shown by time-dependent viscosity studies. The static yield value is 622 dynes per square centimeter.

To determine the acceptability of EXAMPLE NO. 1 as a substitute for an asbestos-containing formula, it was mixed with water to make a joint compound having a consistency of about 65–68 cc. per 100 grams at a viscosity of 550 Brabender units measured on a VC-3 Brabender at about 77° F. This VC-3 Brabender is a commercially available viscometer equipped with a 250 centimeter-gram torsion head operated at a 75–78 r.p.m. spindle speed. EXAMPLE NO. 1 was then tested for workability and check-cracking, along with a conventional asbestos-containing joint compound as a control. Workability is the ability of the joint compound to be manually troweled onto wallboard, and involves such features as slip and resistance to flow. This property was ascertained in all EXAMPLES of this application by the subjective testing of the compound in question by skilled applicators against known standard joint compounds. Check-cracking was measured for all EXAMPLES by screeding a ⅛ inch thick coating, four inches across and eight inches wide, on pieces of wallboard, which are then stored horizontally in a 75° F., 10% relative humidity room for several hours. Drying was enhanced by repeatedly passing the samples under a fan positioned about three feet above the coatings. The dry coatings were inspected visually for cracks. The conventional joint compound used as a control was that marketed by United States Gypsum Company under the same USG Joint Compound Topping. This comprised, as the binder, a mixture of polyvinyl alcohol and polyvinyl acetate totaling 2.4% of the total non-valatile solids, about 65% calcium carbonate filler, about 26% mica, about 5.5% asbestos, and miscellaneous preservatives.

EXAMPLE NO. 1 was found to be approximately equivalent to the above-described conventional, asbestos-containing joint compound, in workability and resistance to check-cracking.

EXAMPLE NO. 2

A similar powdered topping grade can be prepared which differs primarily in the elimination of the montmorillonite clay gel. The following formula No. 2 was tested for cracking and workability, enough water having been added to create a consistency of 73 cc. per 100 grams at a viscosity of 540 Brabender units:

| Ingredient | Weight % of Total Dry Solids |
|---|---|
| Calcium carbonate filler | 80.1 |
| Polyvinyl alcohol binder | 1.0 |
| Hydroxyethyl cellulose thickener | 0.8 |
| Preservatives | 0.5 |
| Mica and sericite | 15.0 |
| SCMC | 0.6 |
| Attapulgus clay | 2.0 |
| Amine-modified montmorillonite clay gel | 0.0 |

It was found that the resulting joint compound was slightly inferior to the control both in bonding and mixing. However, these deficiencies can be overcome by raising the amount of binder to 1.5 or 2.0%, and by mixing with a drill rather than by hand.

EXAMPLES NO. 3–6

Additional grades of SCMC can be used as the water-retention aid, other than "CMC 4H1", provided the degree of substitution (D.S.) is less than 0.7. The amount of viscosity does not appear to be a factor, as will be apparent from the following Examples.

The same formula and weight percents were used in EXAMPLE NO. 1, except that SCMC "CMC 2", "CMC 3M5T", "CMC 4M6", and "CMC 41A", respectively, were used in place of "CMC 4H1". All of these were manufactured by Hercules, and had the following properties.

| Example No. | SCMC | D.S. | Viscosity Range at 25° C (cps) |
|---|---|---|---|
| 3 | "CMC 2" | 0.18–0.28 | 800–1600 at 1% |
| 4 | "CMC 3M5T" | 0.25–0.4 | 200–500 at 2% |
| 5 | "CMC 4M6" | 0.38–0.48 | 300–600 at 2% |
| 6 | "CMC 41A" | 0.38–0.48 | 300–1200 at 2% |

Each of EXAMPLES 3–6, when made into the compound by mixing with water, had workability and crack resistance that was substantially equivalent to these properties provided by EXAMPLE 1.

EXAMPLE NO. 7

A setting type of joint compound fully comparable to EXAMPLE NO. 1 was made by substituting $CaSO_4 \cdot \frac{1}{2}/H_2O$ for the $CaCO_3$ in that example, and by substituting polyvinyl acetate of the type disclosed in aforesaid U.S. Pat. No. 3,297,601, for the polyvinyl alcohol. The weight percents were the same as in EXAMPLE NO. 1, as were the remaining ingredients. Results were comparable to the results of EXAMPLE NO. 1.

EXAMPLE NO. 8

A powdered form, taping grade of joint compound was prepared by using the formula of EXAMPLE NO. 1, except that the binder was increased in amount to the level of 3.5%, with a corresponding reduction in the weight percent of the filler. Workability and crack resistance was comparable to EXAMPLE NO. 1.

EXAMPLE NO. 9

An all-purpose grade of joint compound was prepared from the formula of EXAMPLE NO. 1, by increasing the weight percent of the binder to the level of 5.5%, by decreasing the weight percent of the filler to the level of 74.9%, and by omitting the clay gel. Sufficient slip was realized from the attapulgus clay. If a texturing effect is required, the amount of clay must be at least 2%, with a corresponding change in the amount of filler. Workability and crack-resistance was again found to be comparable to EXAMPLE NO. 1.

EXAMPLE NO. 10

A ready-mixed joint compound suitable for wet storage was prepared from the following formula, which it will be noted is similar to the formula for EXAMPLE NO. 1. Because of the large amount of binder, the EXAMPLE was an all-purpose joint compound.

| Ingredient | Weight % |
|---|---|
| Calcium carbonate filler | 76.6 |
| Polyvinyl acetate binder (as in EXAMPLE NO. 7) | 5.5 |
| Hydroxyethyl cellulose thickener | 0.8 |
| Preservatives | 0.1 |
| Mica and sericite | 15.0 |
| SCMC | 0.5 |
| Attapulgus clay | 1.0 |
| Amine-modified montmorillonite gel | 0.5 |

Enough water was added to provide a consistency of 60 cc. per 100 grams, at a viscosity of 600 Brabender units. The resulting ready-mixed compound was found to have acceptable crack resistance, and its working capabilities were adequate for application by hand tools.

In addition, a ready-mixed joint compound can be prepared from the immediately preceding formula, by omitting the SCMC, by increasing the amount of filler, and by mixing with water to achieve a consistency of 58 cc. per 100 frams, at a viscosity of 600 to 650 Brabender units measured on the VC-3 Brabender. Workability and crack-resistance are comparable to that of EXAMPLE NO. 1.

EXAMPLE NO. 11

Calcium sulfate dihydrate (landplaster) can be substituted for the calcium carbonate filler in the first-stated formula for EXAMPLE NO. 10. The remaining ingredients and preparation are the same, there being, however, a slight change in percentage of ingredients:

| Ingredient | Weight % |
|---|---|
| Landplaster filler | 73.4 |
| Polyvinyl acetate binder (as in EXAMPLE NO. 7) | 5.0 |
| Hydroxyethyl celluose thickener | 0.8 |
| Preservatives | 0.05 |
| Mica and sericite | 16.0 |
| SCMC | 0.25 |

-continued

| Ingredient | Weight % |
|---|---|
| Attapulgus clay | 4.0 |
| Amine-modified montmorillonite gel | 0.5 |

In this case, the SCMC was "CMC-2" obtained from Hercules, which is identified in EXAMPLE NO. 3 above.

When water is added to achieve a consistency of 65 cc. per 100 grams at a viscosity of 620 Brabender units, a ready-mixed all-purpose grade joint compound is produced which is particularly useful for manual application.

EXAMPLE NO. 12

It was further found that the previous EXAMPLE can be further modified so as to omit the SCMC. The following formula was used:

| Ingredients | Weight % |
|---|---|
| Landplaster filler | 79.6 |
| Polyvinyl acetate binder (as in EXAMPLE NO. 7) | 4.5 |
| Hydroxyethyl cellulose thickener | 0.8 |
| Preservatives | 0.1 |
| Mica and sericite | 10.7 |
| SCMC | 0.0 |
| Attapulgus clay | 4.0 |
| Amine-modified montmorillonite gel | 0.3 |

water was added to produce a consistency of 58 cc. per 100 grams at a viscosity of 630 Brabender units. The resulting all-purpose ready-mixed joint compound was found to have adequate crack resistance. Working properties were slightly inferior, but thinning the joint compound to a viscosity no greater than 550 Brabender units produces acceptable working properties.

EXAMPLE NO. 13

It has been found that the attapulgus clay can be omitted in at least certain instances. The following is a representative example of a dry powder, all-purpose formulation.

| Ingredients | Weight % |
|---|---|
| Calcium carbonate filler | 85.3 |
| Polyvinyl alcohol binder | 1.5 |
| Hydroxyethyl cellulose binder | 0.8 |
| Preservatives | 0.7 |
| Mica and sericite | 10.6 |
| Sodium carboxymethyl cellulose | 0.5 |
| Attapulgus clay | 0.0 |
| Amine-modified montmorillonite clay gel | 0.6 |

At the job site, water is added to produce a consistency to 72 cc. per 100 grams at a viscosity of 580 Brabender units. The result is a joint compound having acceptable crack resistance and workability suitable for manual application.

This formula can be altered by using the same amount of "CMC-2" instead of "CMC - 4H1", except that it must be thinned to about 500 Brabenders.

Also a comparable ready-mixed, all-purpose joint compound can be obtained from EXAMPLE 13's formulation by substituting the polyvinyl acetate binder at an increased level of 5.5%, decreasing the filler correspondingly, and adding water to make the wet mix, the amount of water being sufficient to provide a consistency of 60 cc. per 100 grams at 600 Brabender units viscosity. Adequate crack resistance is obtained, and working properties are suitable for application by hand tools. Comparable results are achieved in this ready-mixed formulation regardless whether the filler is calcium carbonate or landplaster.

EXAMPLE NO. 14

A dry powder topping grade can be prepared from the following formula.

| Ingredients | Weight % |
|---|---|
| Calcium carbonate filler | 65.94 |
| Polyvinyl alcohol binder | 0.8 |
| Polyvinyl acetate binder | 1.6 |
| Hydroxyethyl cellulose thickener | 0.8 |
| Preservatives | 0.86 |
| Mica and sericite | 25.0 |
| Sodium carboxymethyl cellulose | 0.0 |
| Attapulgus clay | 3.0 |
| Xanthan gum | 2.0 |

Figure 3:
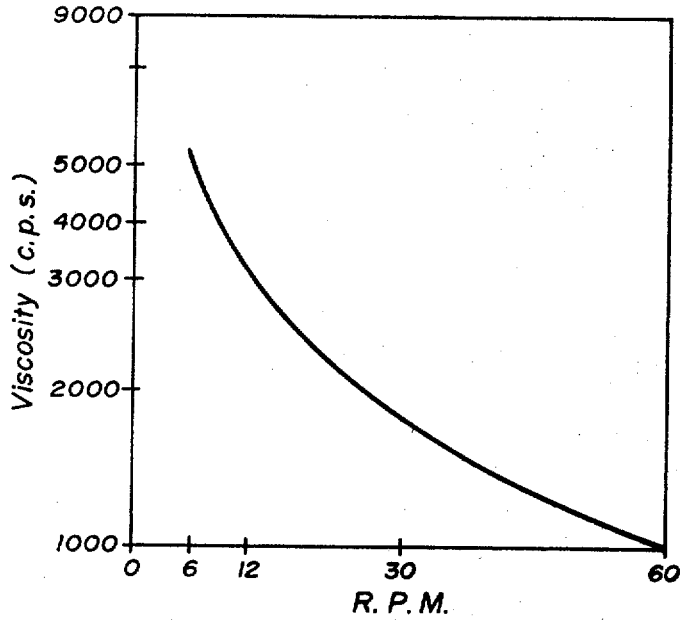

The Xanthan gum can be obtained from Kelco Company under the trade name "Kelzan" and has the following properties. It is a linear polymer with an M.W. in excess of 1 million, comprising a B-linked backbone containing D-glucose, D-mannose and D-glucuronic acid with 1 D-mannose side-chain unit for every eight sugar residues and 1 D-glucose side-chain residue for every sixteen sugar residues. The molar ratio of D-glucose to D-mannose to D-glucuronic acid is about 2.8/3.0/2.0. In water it forms a hydrophilic colloid. Its viscosity is essentially stable at about 1000 cps from 0 to 100° C and from a pH of 1 to 11. FIG. 3 illustrates the viscosity curve of "Kelzan" for a 1% concentration, and particularly its pseudoplastic nature. The curve is reversible.

When water is mixed in by a drill at the job site to give a consistency of about 56 cc. per 100 grams at about 580 Brabender units, the result is a joint compound suitable for a manual application.

EXAMPLE NO. 15

It is possible to drastically reduce the amount of filler, to increase the amount of mica, and to add kaolinite clay, in the formulations for the previous EXAMPLES. Thus, to make a ready-mixed all-purpose joint compound, water was added to the following:

| Ingredients | Weight % |
|---|---|
| Calcium carbonate filler | 37.3 |
| Polyvinyl acetate binder (as in EXAMPLE NO. 7) | 5.5 |
| Hydroxyethyl cellulose thickener | 0.8 |
| Preservatives | 0.1 |
| Mica and sericite | 41.8 |
| SCMC | 0.5 |
| Attapulgus clay | 4.0 |
| Amine-modified montmorillonite gel | 0.0 |
| Kaolinite clay | 10.0 |

The SCMC of this EXAMPLE was "CMC-2" identified in detail in the discussion of EXAMPLE NO. 3. The consistency was found to be 63 cc. per 100 grams, at 500 Brabenders units viscosity. The working characteristics and crack resistence were found to be acceptable for manual application of this joint compound in areas of high humidity.

It was also found that EXAMPLE 15 can be varied by deleting the SCMC and reinstating the modified montmorillonite gel, so that the amount of attapulgus clay is 2.0%, and the amount of gel is 1.0%. The remaining 1.5% is used in increasing the filler. The resulting joint compound is acceptable if used at about 500 Brabender units.

Although the invention has been described in connection with certain preferred embodiments, it is not intended that it be limited thereto. For example, small amounts of asbestos when added to the invention will create an acceptable compound, provided the amount does not exceed the limits imposed by OSHA standards. Thus, it is intended that it cover all equivalents, alternate arrangements, and embodiments as may be included within the scope of the following claims.

What is claimed is:

1. A composition which when mixed with water forms a non-leveling joint compound having properties suitable for use in finishing joints between wallboards [even when], *said composition being* free of asbestos fibers[,] *and* comprising the following ingredients in amounts based on the total dry weight of the composition:

a filler selected from the group consisting of calcium carbonate and calcium sulfate in an amount of between about 37 and 92 percent;

a binder in an amount of between about 1 and 7 percent;

attapulgus clay in an amount of between about 0.5 and 6 percent; and at least one ingredient selected from the group consisting of;

a water-holding agent in an amount of between about 0.1 and 2.0 percent; and a slip-inducing colloid in an amount of between about 0.1 and 2.0 percent selected from the group consisting of modified montmorillonite clay gel and xanthan gum,

*said joint compound being characterized by having desirable working properties including non-leveling and slip properties which heretofore were achieved through the addition of asbestos and which properties are provided herein by substituting attapulgus clay to provide the pseudoplasticity necessary for obtaining said desired properties while avoiding the health hazards associated with the use of asbestos.*

2. The composition as defined in claim 1, wherein said water-holding agent is sodium carboxymethylcellulose having a degree of substitution less than about 0.7.

3. The composition as defined in claim 1, comprising both said water-holding agent and said slip-inducing colloid.

4. The composition as defined in claim 3, wherein said slip-inducing colloid is modified montmorillonite clay gel.

5. The composition as defined in claim 3, wherein said slip-inducing colloid is xanthan gum.

6. The composition as defined in claim 3, wherein said water-holding agent is sodium carboxymethylcellulose having a degree of substitution less than about 0.7.

7. The composition as defined in claim 1, where said filler is calcium carbonate.

8. The composition as defined in claim 1, wherein said filler is calcium sulfate dihydrate.

9. The composition as defined in claim 1, wherein said filler is calcium sulfate hemihydrate.

10. The composition as defined in claim 1, wherein said binder is a polyvinyl acetate emulsion.

11. A ready-mixed non-leveling joint compound having properties suitable for use in coating joints between gypsum wallboards [even when] *said composition being* free of asbestos fibers[,] *and* comprising the following ingredients in amounts based on the total dry weight of the composition:

water;

a filler selected from the group consisting of calcium carbonate and calcium sulfate in an amount of between about 37 and 92 percent;

a polyvinyl acetate emulsion in an amount of between about 1 and 7 percent;

a slip-inducing colloid in an amount of between about 0.1 and 2.0 percent selected from the group consisting of modified montmorillonite clay gel and xanthan gum; and attapulgus clay in an amount of between about 0.5 and 6.0 percent,

*said joint compound being characterized by having desirable working properties including non-leveling and slip properties which heretofore were achieved through the addition of asbestos and which properties are provided herein by substituting attapulgus clay to provide the pseudoplasticity necessary for obtaining said desired properties while avoiding the health hazards associated with the use of asbestos.*

12. The composition as defined in claim 11, additionally comprising sodium carboxymethylcellulose in an amount of between about 0.1 and 2.0 percent.

* * * * *